United States Patent [19]

Chan et al.

[11] Patent Number: 5,504,412
[45] Date of Patent: Apr. 2, 1996

[54] REPLACEABLE BATTERY PACK OF RECHARGEABLE BATTERIES

[75] Inventors: Ka-Ming Chan; Kit-Shing Chu, both of Hong Kong, Hong Kong

[73] Assignee: GSL Rechargeable Products, Limited, Kowloon, Hong Kong

[21] Appl. No.: 214,003

[22] Filed: Mar. 15, 1994

Related U.S. Application Data

[63] Continuation of Ser. No. 931,133, Aug. 6, 1992, abandoned.

[51] Int. Cl.⁶ .............................. H02J 7/00; H01M 10/46; H01M 10/44
[52] U.S. Cl. .................................. 320/2; 15/339; 429/96; 429/97; 429/98; 429/99; 429/100
[58] Field of Search .................................. 429/96, 97, 98, 429/99, 100; 320/2; 15/339

[56] References Cited

U.S. PATENT DOCUMENTS

| | | | |
|---|---|---|---|
| 3,941,618 | 3/1976 | Mabuchi | 136/173 |
| 4,225,814 | 9/1980 | Gantz et al. | 320/2 |
| 4,389,469 | 6/1983 | Nicholls | 429/98 |
| 4,616,169 | 10/1986 | Proffitt | 320/2 |
| 4,934,020 | 6/1990 | Jackson | 15/339 |
| 4,993,106 | 2/1991 | Hult et al. | 15/339 |
| 4,998,055 | 3/1991 | Nash et al. | 320/2 |
| 5,005,252 | 4/1991 | Steiner et al. | 15/339 |
| 5,138,351 | 8/1992 | Wiegand et al. | 354/81 |
| 5,140,249 | 8/1992 | Linder et al. | 320/2 |
| 5,144,217 | 9/1992 | Gardner et al. | 320/2 |
| 5,208,525 | 5/1993 | Lopic et al. | 320/2 |

FOREIGN PATENT DOCUMENTS

| | | |
|---|---|---|
| 3407734 | 9/1985 | Germany . |
| 1422759 | 1/1976 | United Kingdom . |

Primary Examiner—Mukund J. Shah
Assistant Examiner—Matthew V. Grumbling
Attorney, Agent, or Firm—Longacre & White

[57] ABSTRACT

The present invention is directed to a releasable battery pack containing rechargeable batteries. In particular, the present invention facilitates the easy collection and proper disposal of useless rechargeable batteries without discarding the electrical device in which the rechargeable batteries are installed. Further, the present invention is directed to a releasable, rechargeable battery pack which is not removed from the electrical device during charging of the battery pack. The present invention is also directed to a battery pack fitted to a wet and dry portable vacuum cleaner.

4 Claims, 3 Drawing Sheets

REPLACEABLE BATTERY PACK OF RECHARGEABLE BATTERIES

This is a continuation of application Ser. No. 07/931,133, filed Aug. 6, 1992, which was abandoned upon the filing hereof.

BACKGROUND OF THE INVENTION a) Field of the Invention

This invention relates to an easily recyclable battery pack. In particular, the present invention finds direct application in portable, rechargeable battery operated devices which are adapted to be connected to a small and simple battery charging circuit. More particularly, the present invention applies to a rechargeable wet and dry vacuum cleaner.

b) Description of Related Art

Battery operated portable devices, such as a wet and dry vacuum cleaner, which include a rechargeable battery or battery pack within the housing of the device are known. One drawback of these known devices is that whenever the rechargeable batteries become useless, it is generally not economical to repair the device which is therefore scrapped. However, legislation requires the collection and proper disposal of rechargeable batteries, since they may contain potentially hazardous materials.

It would be desirable to ease both the replacement of rechargeable batteries, and the collection of useless rechargeable batteries, by providing the rechargeable batteries in a separate enclosure which can be easily removed and replaced with a substitute. It would also be desirable to recharge the batteries simply by placing the device in a charging support bracket, whereupon a charging circuit is connected to the device without the necessity of removing and transferring the battery pack to an external, separate charging stand.

SUMMARY OF THE INVENTION

Accordingly, it is an object of the present invention to ease replacement of rechargeable batteries in a device such as a wet and dry vacuum cleaner, and to provide an effective means to facilitate collection and disposal of useless rechargeable batteries.

It is another object of the present invention to incorporate the enclosure for the rechargeable batteries into the styling of a device such as a wet and dry vacuum cleaner.

It is yet another object of the present invention to provide a charging support bracket to charge the batteries while a device, such as a wet and dry vacuum cleaner, is engaged with the charging support bracket, thus eliminating the need to remove the battery pack from the device and transfer the battery pack to an external, separate charging stand.

The present invention discloses a battery pack for a device such as a wet and dry vacuum cleaner, comprising an enclosure, a terminal plate holder and two terminal plates. Rechargeable batteries are placed inside the enclosure and the terminal plates are fixed in place on the terminal plate holder.

Means are provided for ensuring the proper polarity of the electrical connections between the battery pack and the device. For example, at least one aperture into the enclosure may particularly expose the anode and cathode terminal plates which are adapted to respectively engage a pair of contact plates correspondingly arranged on the device. Biasing means may be used to resiliently load the engagement between the contact plates on the device and the terminal plates on the battery pack.

The housing of a device such as a wet and dry vacuum cleaner, may be styled to include an area adapted to receive the battery pack. For example, the battery pack may be slid into a recessed area of the housing, and retained in position until released by a release button installed on the housing.

The present invention further discloses a charging support bracket which is adapted to both supportably receive the device and at the same time, charge the battery pack. Consequently, the battery pack may be charged without being removed from the device, thereby eliminating the need for a separate charging stand.

DESCRIPTION OF THE PREFERRED EMBODIMENTS

Figure 1:
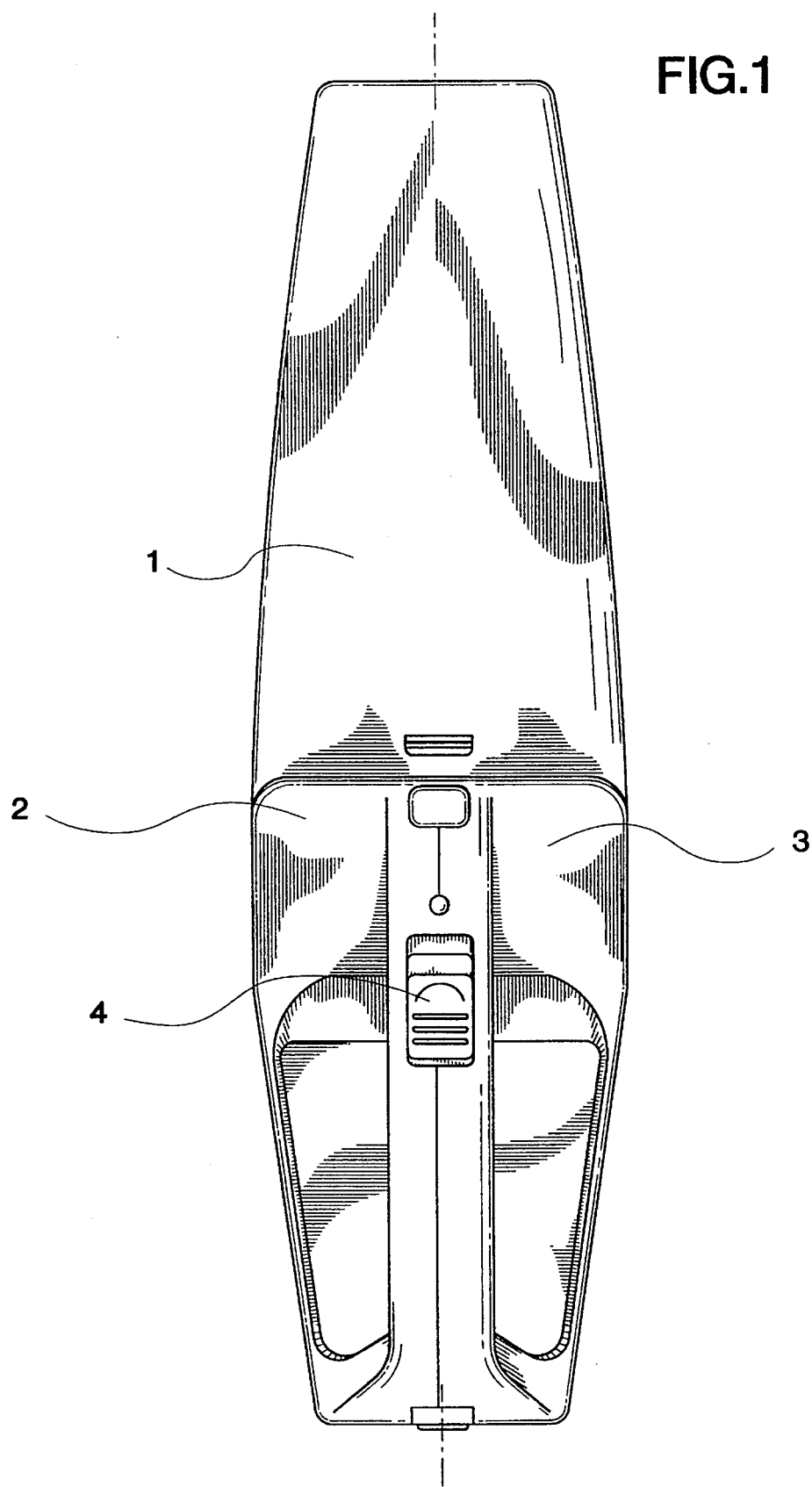
FIG. 1 is a plan view of a device according to the present invention.
Figure 2:
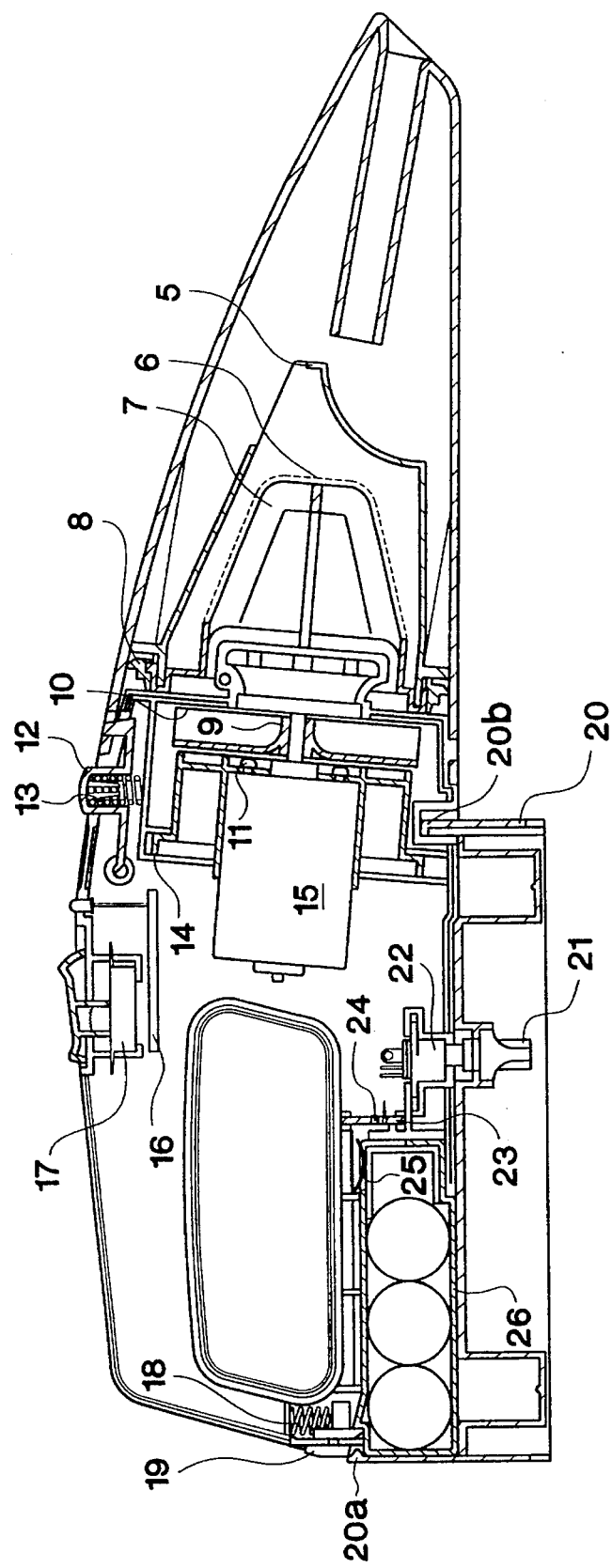
FIG. 2 is a cross-section taken along the line 2—2 of the device shown in FIG. 1.

FIGS. 1 and 2 show an example of a portable device according to the present invention. Additional examples of portable devices include kitchen aides such as electric knifes and hand-held mixers, tools such as electric screwdrivers and drills, hygiene aides such as electric toothbrushes and electric razors, etc. The present invention is described in association with a wet and dry vacuum cleaner, however it is understood that the present invention is applicable to many portable devices.

FIG. 1 shows a wet and dry vacuum cleaner comprising a nozzle 1 detachably fitted on a housing having a left housing 2 and a right housing 3. The left housing 2 and the right housing 3 are fastened together so as to slidably mount a switch cap 4 therebetween. The nozzle 1 is retained on the housing 2,3 in a known manner by lock means comprising a lock button 12 and a lock button spring 13.

FIG. 2 shows a filter means is cooperatively retained between the nozzle 1 and the housing 2,3. The filter means comprises a dust collector 5, a filter 6, a filter holder 7 and a sealing rubber 8. The space between the dust collector 5 and the filter 6 provides a receptacle for the matter drawn into the vacuum cleaner through the nozzle 1. The filter holder 7 prevents the filter 6 from collapsing during operation of the vacuum cleaner, while the sealing rubber 8 simultaneously forms an airtight seal between the nozzle 1, the housing 2,3, the dust collector 5 and the filter holder 7.

Suction is generated in the vacuum cleaner using impeller means, comprising an impeller 9 and an impeller cover 10, driven by an electric motor 15. The motor 15 is secured to a motor bracket 14 by at least one motor screw 11. In turn, the motor bracket 14 is secured between the left housing 2 and the right housing 3.

A control means for monitoring and controlling the vacuum cleaner comprises a monitor circuit 16 and a control switch 17. The control switch 17 is actuated from outside the housing 2,3 by the switch cap 4.

Energy for the electric motor 15 is provided by a battery pack 26 fitted into a recessed area of the housing 2,3. The battery pack 26 is retained within the housing 2,3 by a release means comprising a release spring 18 biasing a release button 19 into a position to block the extraction of the battery pack 26 from the housing 2,3.

A charging support bracket 20 is adapted to receive and support the vacuum cleaner when it is not in service. The charging support bracket 20 includes engagement elements 20a, 20b to securely engage the charging support bracket with respect to the housing 2,3. Simultaneously, the charging support bracket 20 is adapted to charge the battery pack 26 from a charger 21. The charger 21 is adapted to mate with a charging jack 22 on the vacuum cleaner. When the vacuum cleaner is received and supported by the charging support bracket 20, the charger 21 is simultaneously connected to the charging jack 22.

Figure 3:
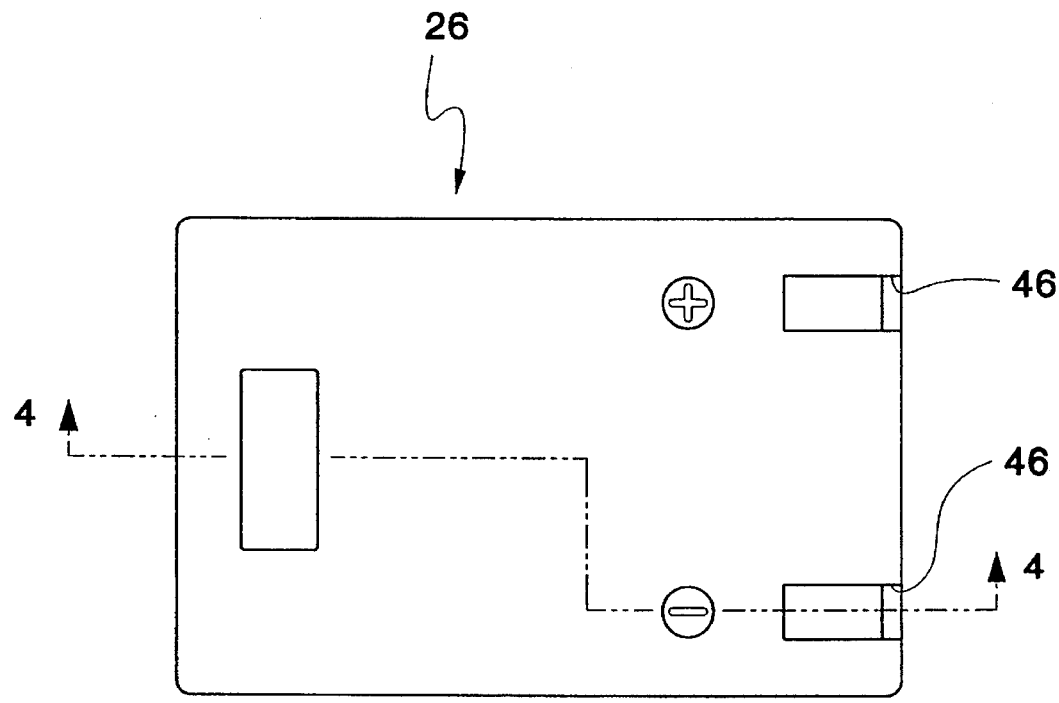
FIG. 3 is a plan view of a battery pack according to the present invention.
Figure 4:
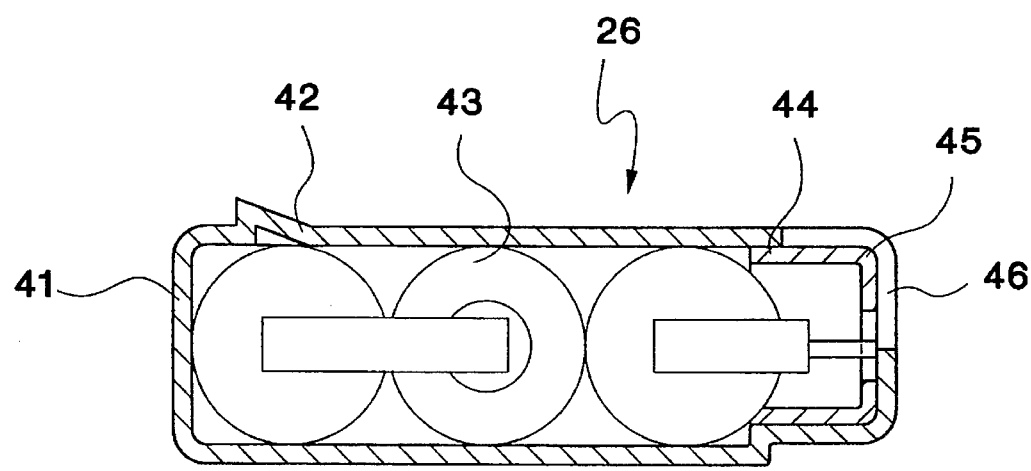
FIG. 4 is a cross-section taken along the line 4—4 of the battery pack shown in FIG. 3.

FIGS. 3 and 4 show a battery pack 26 extracted from the portable device according to the present invention. A lower compartment 41 and an upper compartment 42 are fixed together to form an enclosure around one or more rechargeable batteries 43 (three rechargeable batteries are shown in FIG. 4). The rechargeable batteries 43 are electrically connected to one another and to a pair of terminal plates 44. The conductive terminal plates 44 are mounted on a non-conductive terminal plate holder 45 which in turn is secured in the enclosure 41,42. Each of the terminal plates 44 is either the anodic (−) or the cathodic (+) terminal plate based upon their respective connections to the rechargeable batteries 43. The terminal plates 44 are exposed to the exterior of the enclosure 41,42 via apertures 46 in the enclosure. As shown in FIG. 3, the type of the terminal plate may be identified with appropriate markings proximate to the apertures 46. Further, because of the asymmetrical arrangement of the apertures 46 with respect to the enclosure 41,42, it is not possible to damage the vacuum cleaner by improperly connecting the battery pack 26. That is to say, the only orientation of battery pack 26 which provides power to the vacuum cleaner inherently assures the proper polarity of the connections between the battery pack 26 and the vacuum cleaner.

Referring again to FIG. 2, energy is transferred between the battery pack 26 and the vacuum cleaner through contact means comprising a non-conductive contact plate holder 23 secured between the left housing 2 and the right housing 3, and a pair of conductive contact plates 25 secured to the contact plate holder 23 by eyelets 24. Each of the contact plates 25 is arranged to cooperatively engage one of the terminal plates 44 of the battery pack 26. The configuration and material of the contact plates 25 are selected to resiliently load the engagement between the sets of plates.

Various embodiments according to the present invention are believed to be within the scope of the appended claims. For example, the battery pack 26 may contain more than, or less than three rechargeable batteries. Further, the apertures 46 in the enclosure 41,42 may be alternatively configured as long as there is only one orientation for successfully connecting the battery pack 26 to the vacuum cleaner. Additionally, the terminal plates 44, rather than the contact plates 25, may be configured to resiliently load the engagement between the sets of plates.

What is claimed is:

1. An electrical handheld vacuum for generating air suction comprising:

a housing encasing electrical circuitry of the electrical handheld vacuum, said housing elongated along a longitudinal direction to define a rear end and a forward end opposite to said rear end, said air suction being generated at said forward end;

a releasable battery pack fitted in and substantially filling a depression on the exterior of said housing, said releasable battery pack being slidingly inserted into said depression along said longitudinal direction into said rear end and toward said forward end, said battery pack consisting of a plurality of rechargeable batteries inside an enclosure and a pair of terminal plates mounted inside said enclosure, each of said pair of terminal plates is either the anode or the cathode of said releasable battery pack, and each of said pair of terminal plates is exposed to the outside of said enclosure through at least one aperture in said enclosure;

release means for blocking the extraction of said enclosure from said depression on the exterior of said housing, said release means includes a spring biased release button positioned at said rear end, said release button being biased toward a position to block the extraction of said enclosure from said depression on the exterior of said housing;

a charging support bracket supporting and securely engaging said housing through first and second engagement elements removably received in respective first and second apertures provided in said housing, said first engagement element being received in said first aperture at a location between said spring biased release button and said enclosure, said charging support bracket extending across said enclosure at said rear end;

charging means for charging said plurality of rechargeable batteries, said charging means includes a charging plug rigidly fixed to said charging support bracket and a charging jack rigidly fixed to said housing, whereby said charging plug and said charging jack are operatively connected as said charging support bracket supports and securely engages said housing; and contact means for transferring energy between said charging jack and said releasable battery pack, said contact means including a pair of contact plates cooperatively engaging a respective one of said pair of terminal plates.

2. The electrical device according to claim 1 wherein said apertures are asymmetrically arranged with respect to said enclosure, whereby said battery pack is adapted to provide energy to said electrical device only when properly fitted into said depression on the exterior of said housing.

3. The electrical device according to claim 1 wherein said electrical device includes an electric motor supported within said housing, an impeller means for generating air suction, and a filter means for separating foreign matter from said suction air.

4. The electrical device according to claim 3 wherein said electrical device further includes control means for and controlling said electric motor.

* * * * *